Patented May 6, 1941

2,240,862

UNITED STATES PATENT OFFICE 2,240,862

METHOD OF ADHERING RUBBER TO BRASS

James W. Schade, Akron, Ohio, assignor to The B. F. Goodrich Company, New York, N. Y., a corporation of New York No Drawing. Application December 16, 1937, Serial No. 180,200

3 Claims. (Cl. 154—40)

This invention relates to the adhesion of rubber to brass, and has as its object to provide a method whereby rubber is adhered to an uncorroded brass surface.

It has long been known that rubber will adhere directly to brass containing about 65% of copper and 35% of zinc. It has been common practice, therefore, to adhere rubber to other metals, especially iron, by depositing a layer of brass on the iron and adhering the rubber thereto. Brass, however, corrodes very rapidly. In the presence of the moisture present in the atmosphere, brass is corroded to such an extent by acid fumes, hydrogen sulfide, sulfur chloride, or even by contact with uncured rubber that it will no longer adhere when cured against rubber. The rubber must therefore be adhered as soon as possible after the brass is applied to the metal, even slight delays often seriously affecting the adhesion. Attempts to cover the surface of the brass with a moisture-proof coating have often ruined the adhesion.

I have discovered that by applying a thin, continuous film of sulfur to the surface of the brass, I am able to protect it from corrosion and at the same time produce excellent adhesion. The sulfur is usually applied by dipping the brass or brass-plated article in a bath of molten sulfur. The protective sulfur coating should be rather thin, as a very thick layer sometimes produces undesirably hard rubber when a rubber stock is cured in contact therewith. To assist in the formation of a thin sulfur layer, an introfier such as naphthalene, chloronaphthalene, diphenyl, dibenzyl, or triphenyl phosphate may be added to the molten sulfur. Introfiers have the property of reducing the viscosity of molten sulfur, and for that reason are often used to assist in the impregnation of fibrous materials with sulfur. They are employed in this process because the increased fluidity of the sulfur bath permits the formation of a thinner film of sulfur on the brass. The introfiers are added in varying quantities depending upon the particular material used, from .2% to .4% of triphenyl phosphate being sufficient while naphthalene is often used in proportions up to 10%.

As a specific embodiment of one modification of my invention, a rubber stock was prepared containing rubber 26.88 parts by weight, zinc oxide 69.04 parts, carbon black 1.40 parts, sulfur 2.44 parts, and methylene para-toluidine 0.24 part. A piece of iron was plated with brass, dried, immersed momentarily in a bath of molten sulfur and allowed to cool. A sheet of the stock prepared above was cured against the sulfur-coated brass surface in a press for 15 minutes at 292° F. When the composite article was tested, it was found that it was impossible to separate the rubber from the metal without tearing the stock. The method of this invention may be practiced with equal success by using an adhesive such as a rubber cement or rubber isomer cement between the rubber and the sulfur surface.

The term rubber is used in the specification and claims to include vulcanizable caoutchouc, both natural and synthetic, balata, gutta percha, rubber, isomers, and like products whether or not admixed with fillers, pigments, antioxidants, or accelerating agents.

While I have herein disclosed specific embodiments of my invention, I do not intend to limit myself strictly thereto, for it will be obvious to those skilled in the art that many modifications are within the spirit and scope of the invention as defined in the appended claims.

I claim:

1. The method of adhering rubber to a brass surface which comprises covering the brass with a thin, continuous film consisting essentially of sulfur, in direct contact with the brass surface, superposing the rubber, and subjecting the assemblage to heat and pressure.

2. The method of adhering rubber to a brass surface which comprises depositing from a bath of molten sulfur a thin, continuous film of sulfur upon the brass, superposing the rubber and subjecting the assemblage to heat and pressure.

3. The method of adhering rubber to a brass surface which comprises depositing from a bath of molten sulfur containing naphthalene a thin, continuous film of sulfur upon the brass, superposing the rubber, and subjecting the assemblage to heat and pressure.

JAMES W. SCHADE.